(12) United States Patent  
Caro et al.

(10) Patent No.: US 7,258,710 B2
(45) Date of Patent: Aug. 21, 2007

(54) MARITIME EMISSIONS CONTROL SYSTEM

(75) Inventors: Salvador Caro, Camarillo, CA (US); Henning Ottsen, Ventura, CA (US); John G. Powell, Santa Clarita, CA (US)

(73) Assignee: Advanced Cleanup Technologies, Inc., Rancho Dominguez, CA (US)

( * ) Notice: Subject to any disclaimer, the term of this patent is extended or adjusted under 35 U.S.C. 154(b) by 70 days.

(21) Appl. No.: 10/835,197

(22) Filed: Apr. 29, 2004

(65) Prior Publication Data

US 2005/0244318 A1 Nov. 3, 2005

(51) Int. Cl.
*A01F 25/00* (2006.01)
*A01F 25/10* (2006.01)

(52) U.S. Cl. ............... 55/385.1; 55/356; 55/DIG. 18; 55/DIG. 46; 95/273; 110/121; 110/125; 110/216; 110/217; 114/187; 366/22; 366/25; 366/40; 440/89 A; 440/89 R; 440/113

(58) Field of Classification Search ............... 55/385.2, 55/356, 385.1, DIG. 18, DIG. 46; 95/273; 15/347, 352; 366/22, 25, 40; 454/187; 440/89 A, 440/89 R, 113; 114/187; 110/121, 125, 110/216, 217
See application file for complete search history.

(56) References Cited

U.S. PATENT DOCUMENTS

| | | | | |
|---|---|---|---|---|
| 1,013,358 A | * | 1/1912 | Andrews | 454/3 |
| 1,439,226 A | * | 12/1922 | Clarke | 52/66 |
| 4,099,452 A | * | 7/1978 | Costen | 454/39 |
| 4,442,766 A | * | 4/1984 | Hawkins | 100/35 |
| 4,637,300 A | * | 1/1987 | Cole | 454/1 |
| 5,092,226 A | * | 3/1992 | McCloskey | 454/5 |
| 5,281,246 A | * | 1/1994 | Ray et al. | 55/302 |
| 5,460,301 A | | 10/1995 | Ebinger et al. | |
| 5,613,990 A | * | 3/1997 | Diachuk | 55/383 |
| 5,622,538 A | * | 4/1997 | Diachuk | 55/383 |
| 5,687,773 A | * | 11/1997 | Ryan et al. | 138/96 R |
| 5,823,218 A | * | 10/1998 | Schlecht et al. | 137/2 |
| 5,842,918 A | * | 12/1998 | Cowen | 454/12 |
| 5,980,343 A | * | 11/1999 | Rolinski | 440/89 R |
| 6,022,389 A | * | 2/2000 | Vross et al. | 55/315.1 |
| 6,244,918 B1 | * | 6/2001 | Cameron | 440/89 R |
| 6,332,308 B1 | * | 12/2001 | Miller | 55/385.5 |
| 6,463,958 B1 | | 10/2002 | Schwing | |
| 6,726,736 B2 | * | 4/2004 | Koclejda et al. | 55/385.2 |
| 6,910,930 B1 | * | 6/2005 | Mitchell | 440/89 R |

* cited by examiner

*Primary Examiner*—Minh-Chau T. Pham
(74) *Attorney, Agent, or Firm*—Kenneth L. Green; Edgar W. Averill, Jr.

(57) ABSTRACT

An Advanced Maritime Emissions Control System (AMECS) includes several Exhaust Intake Bonnets (EIBs) of different size and/or shape, an Emissions Capture System (ECS), and an Advanced Maritime Emissions Control Unit (AMECU) mounted on an Unpowered Seagoing Barge (USB). The EIB includes a cage formed by downward curved ribs, a shroud which is lowerable to cover the ribs, a belt near a lower edge of the EIB for retaining and sealing the EIB to a stack, and a mechanism for tightening the lower edge of the EIB (and thus the belt) around the stack. The ECS lifts one of the several EIBs onto the stack of an Ocean Going Vessel (OGV). Exhaust from the stack is drawn through a large diameter duct to the AMECU. The AMECU processes the exhaust through multiple treatment stages. The stages include pre conditioning the exhaust, oxidizing, reducing, polishing, and precipitating.

35 Claims, 6 Drawing Sheets

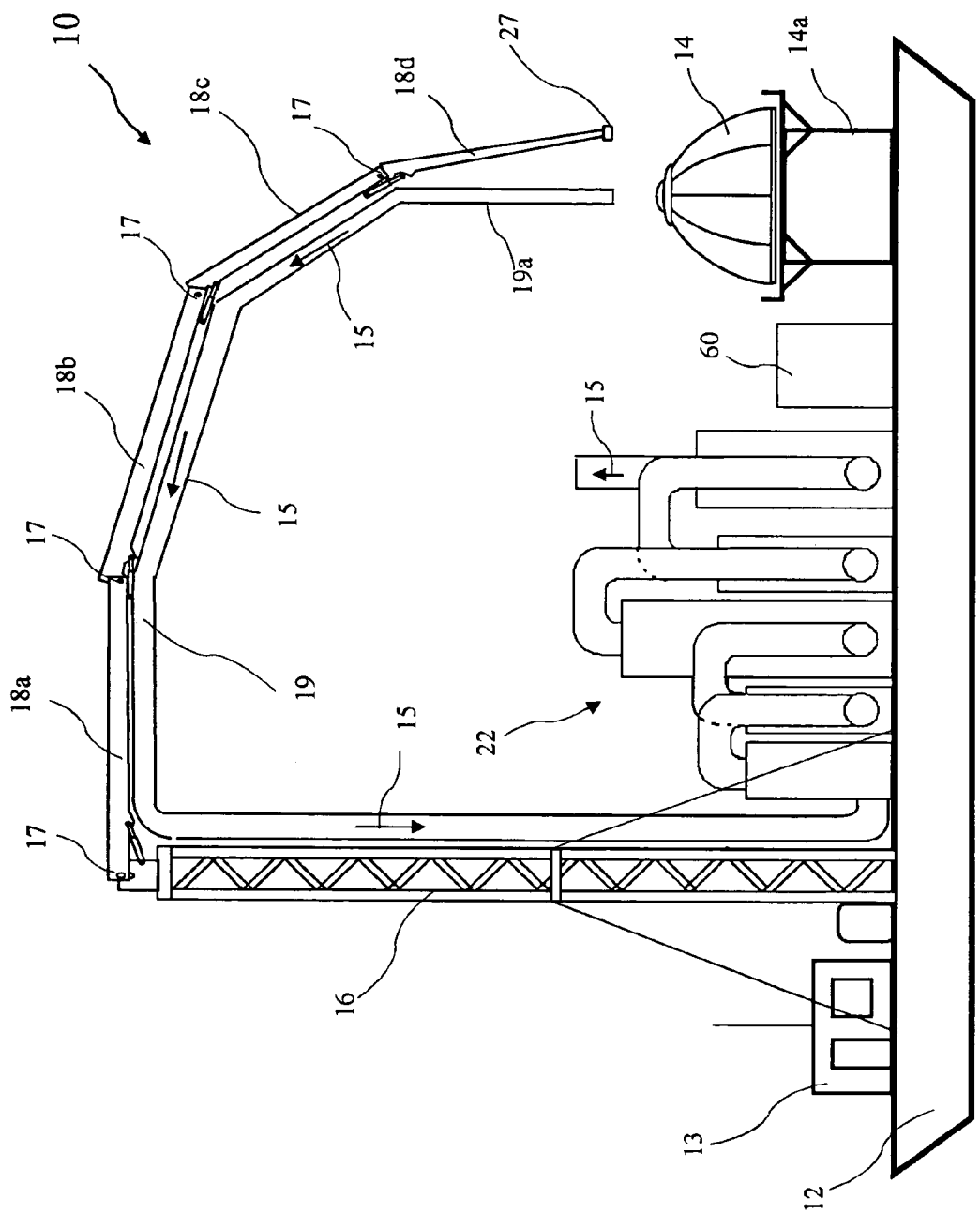

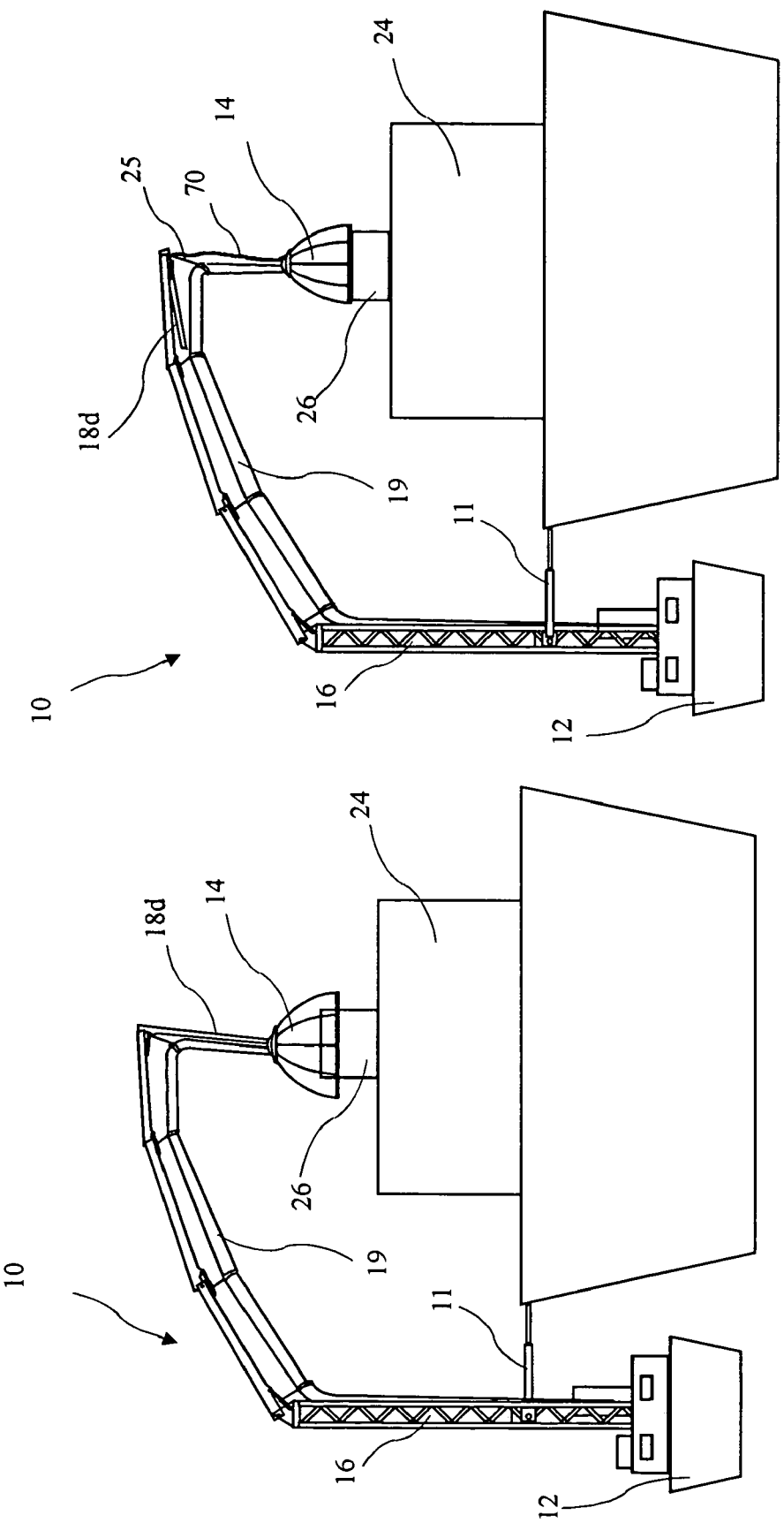

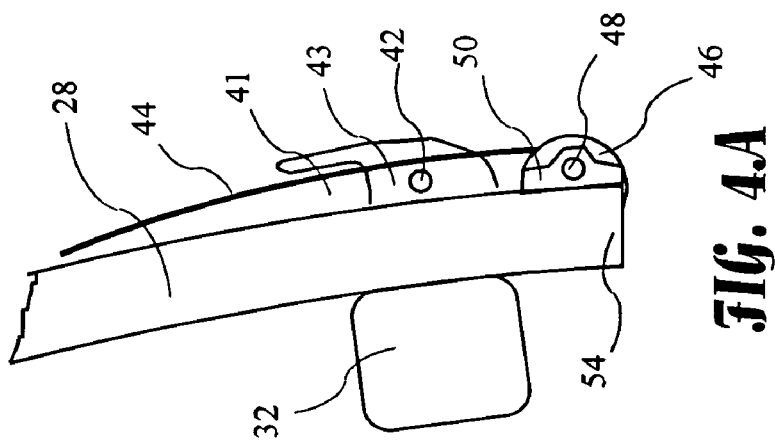
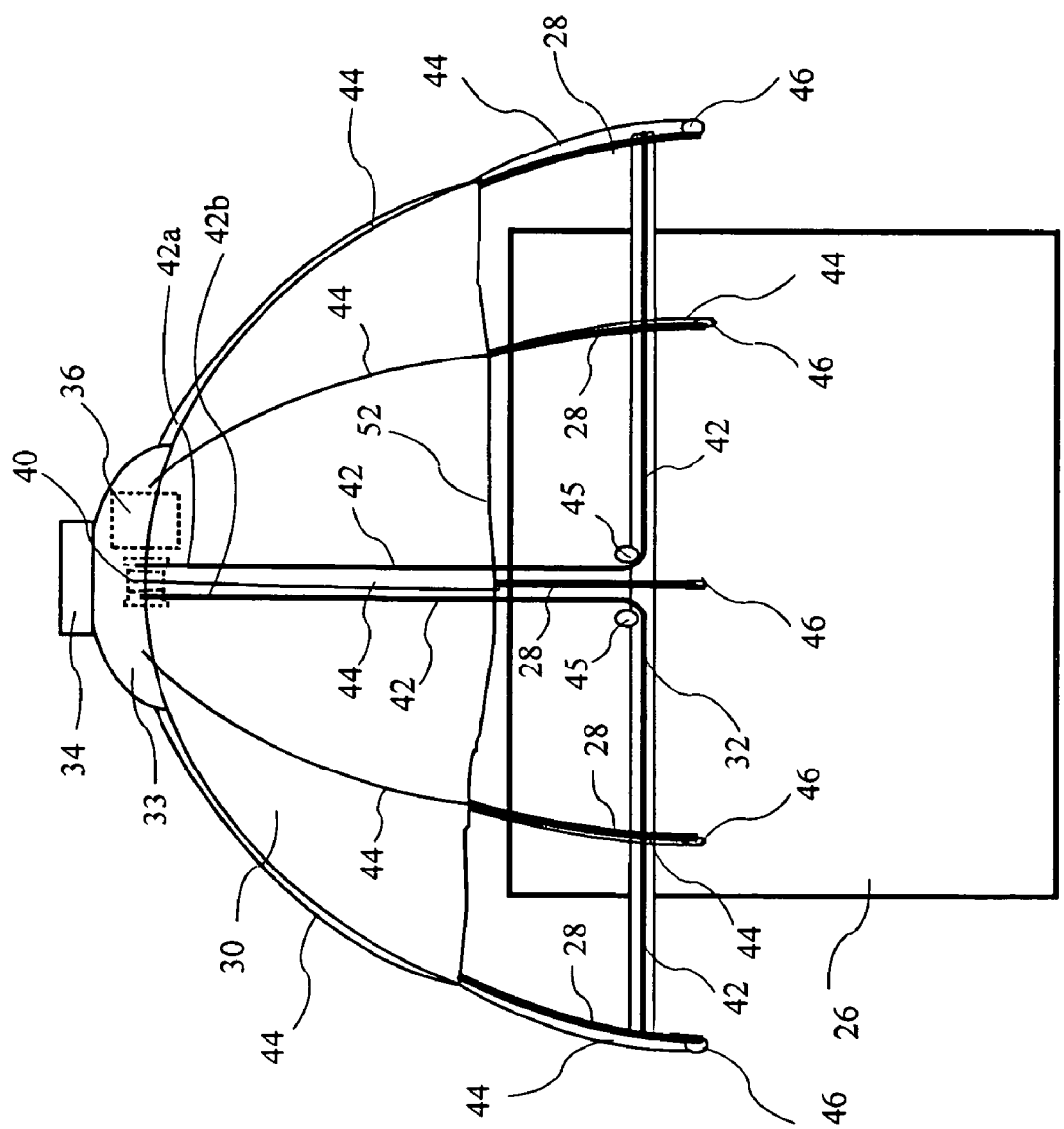

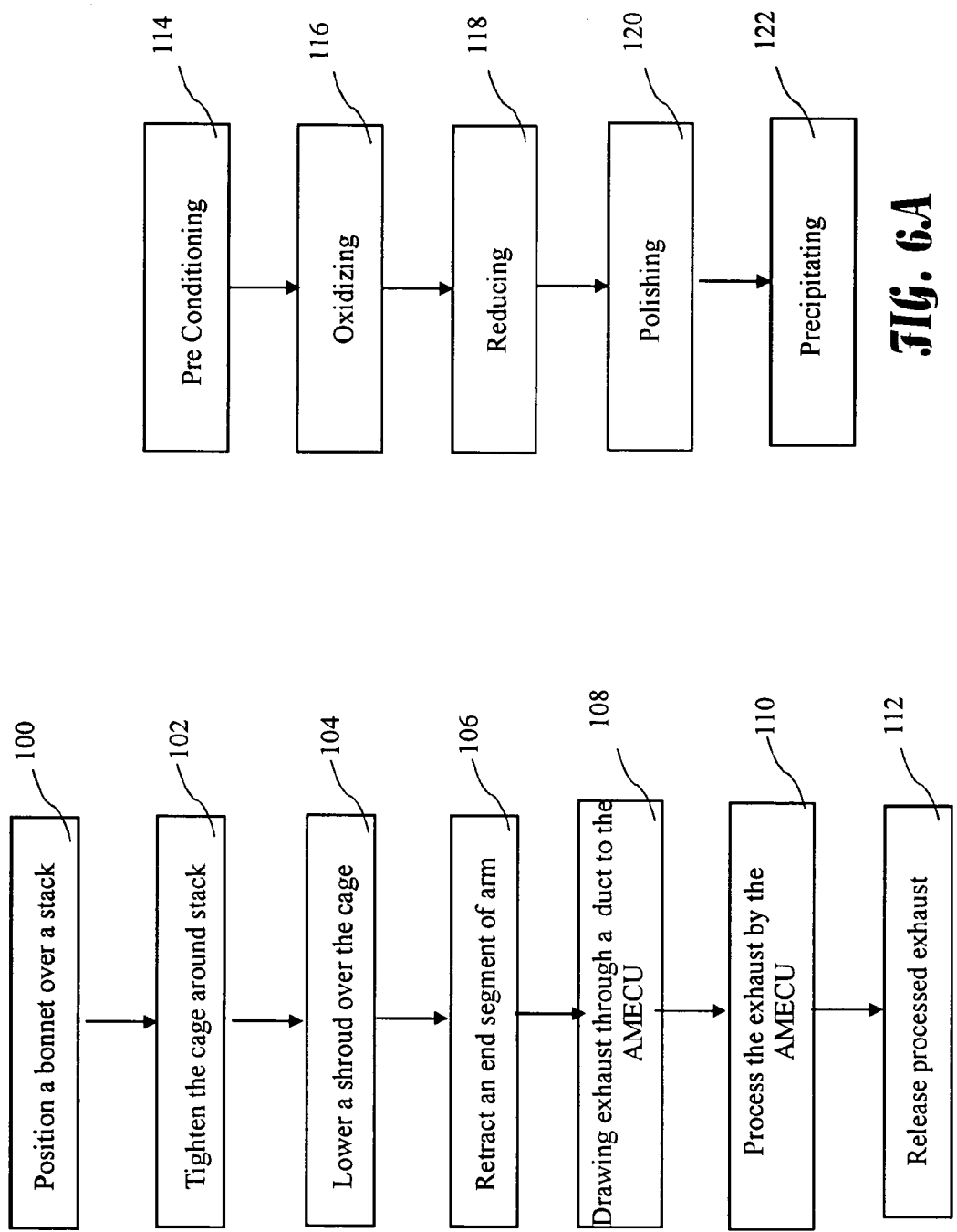

MARITIME EMISSIONS CONTROL SYSTEM

BACKGROUND OF THE INVENTION

The present invention relates to the reduction of emissions from Ocean Going Vessels (OGVs), and more particularly to a system for capturing and processing emissions from OGVs in the vicinity of a port.

A substantial quantity of pollutants are produced by burning fuel in OGVs. The pollutants produced when an engine burns bunker an/or diesel fuel is a complex mixture of thousands of gases and fine particles, commonly known as soot, which contains more than forty toxic air contaminates. These contaminates include arsenic, benzene, and formaldehyde along with other ozone-forming pollutants that are components of smog and acid rain, such as carbon dioxide ($CO_2$), sulphur dioxide ($SO_2$), and nitrogen oxides ($NO_x$). An OGV may create and exhaust as much $NO_x$ as 12,500 automobiles or as an oil refinery, and thus is a substantial health risk to port workers and residents of surrounding communities, and may physically damage structures and equipment.

BRIEF SUMMARY OF THE INVENTION

The present invention addresses the above and other needs by providing an Advanced Maritime Emissions Control System (AMECS) comprising a multiplicity Exhaust Intake Bonnets (EIBs), an Emissions Capture System (ECS) comprising a tower and actuating arm, an Advanced Maritime Emissions Control Unit (AMECU), and a duct connecting the EIB to the AMECU. The AMECS is preferably mounted on an Unpowered Seagoing Barge (USB).

The AMECS is deployed when an Ocean Going Vessel (OGV) is at sea, for example, when the OGV is approaching the three miles limit. The USB carrying the AMECS, is assisted by a tug to meet the OGV at a point off the coast. As the USB approaches the OGV, the tug positions the USB along the OGV side opposite to the side from which the OGV will be unloaded. Once alongside the OGV, the USB is secured to the OGV, and preferably, a stabilization arm is extended between the tower and the OGV, to absorb shock and provide stability for the ECS. The ECS is then activated, hosting an EIB selected from a multiplicity of EIBs shaped to accommodate the particular ship's stack configuration, onto the stack. An EIB attachment mechanism (preferably including a soft belt which may be tightened around the stack by drawing a cord) is then actuated to create a soft attachment between the EIB and the ship's stack. Once the USB is secured to the OGV, and EIB is properly attached to the stack, the AMECU is started thereby forming a pressure drop in the duct. This begins the process of directing the stack exhaust into the AMECU residing on the USB. A shroud is then lowered from a upward end of the EIB over the EIB, thereby forming a seal around the stack. An end segment of the articulating arm is then retracted, leaving a flexible end section of the duct connected to the EIB. Thus attached, the assembly is able to sustain movement between of the USB relative to the OGV of approximately five vertical feet and approximately five horizontal feet, without adversely affecting the attachment of the EIB or placing too great a stress on the stack.

The OGV and attached USB are then guided into port and docked. The AMECS system may remain alongside the OGV, ensuring that the exhausted emissions are reduced as much as existing technology can provide. Alternatively, a shore based AMECS may be connected to the stack while the OGV is docked. When the OGV is ready for departure, it is guided out of the harbor and out to sea a distance of, for example, approximately three miles, where the EIB is detached and the OGV is released allowing it to proceed to its next destination. To release the EIB, the blowers are shut down, the shroud retracted, the articulating arm reattached, and the tension to the cord removed allowing the belt to relax, thereby permitting the EIB to be removed. The AMECS is then returned to its serving dock where any stored solid contaminates are removed and the system readied for the next OGV to arrive.

In accordance with one aspect of the invention, there is provided an Advanced Maritime Emissions Control System (AMECS) for Ocean Going Vessels (OGVs) comprising a barge, a tower mounted to the barge, an articulating arm mounted to the tower, an Exhaust Intake Bonnet (EIB) attached to a last segment of the articulating arm, an Advanced Maritime Emissions Control Unit (AMECU), and a duct for carrying the exhaust from the EIB to the AMECU. The EIB captures the exhaust from an OGV stack, and the AMECU processes the exhaust. The EIB is selected from a set of several EIBs of different sizes and/or shapes.

An exemplar AMECU 22 includes two primary treatment systems. The first system accomplishes reduction of nitrogen oxides (NOx) as its primary purpose, and the second system focuses on the reduction of Particulate Matter (PM). Each system may have as a secondary benefit, the reduction of other atmospheric contaminants.

An exemplar first system is a four-stage particulate/NOx/$SO_2$ scrubber system. The first system includes a Pre Conditioning Chamber (PCC) quench vessel first stage, an oxidation column second stage, a reduction column third stage, and a caustic (or polishing) column fourth stage. An exemplar second system is a wet electrostatic precipitation system to further reduce the concentration of PM.

Various numbers of stages, functions of the stages, orders of the stages, or contaminant reduction processes in any or all of the stages may be utilized to construct an AMECU. Alternative exemplar first systems may include, but are not limited to, Selective Catalytic Reactors (SCR) and various emerging technologies such as thermal or plasma enhanced catalytic or non-catalytic NOx removal or NOx conversion systems, and other technologies to reduce NOx or convert NOx into more benign compounds.

Alternative exemplar second systems may include, but are not limited to, washers, ionizing wet scrubbers, wet scrubbers, packed column scrubbers, cyclone scrubbers, impingement scrubbers, eductor scrubbers, vortex scrubbers, venturi scrubbers, and others, as well as filters of various types, both passive and dynamic. Some of these devices may also be used as the first stage in a multistage system. An AMECS including any combination of these, or similar devices, is intended to come within the scope of the present invention.

In accordance with another aspect of the invention, there is provided a method for emissions control, the method comprising securing a bonnet over a stack of an Ocean Going Vessel (OGV), drawing exhaust from the stack through a duct to an emissions control system, and processing the exhaust by the emissions control system. Securing the bonnet over the stack comprises positioning a cage over a stack, tightening the cage around the stack, and lowering a shroud over the cage. Processing the exhaust by the emissions control system preferably comprises two primary treatment systems. The first system accomplishes reduction of nitrogen oxides (NOx) as its primary purpose, and the second system focuses on the reduction of Particulate Matter (PM).

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is an Advanced Maritime Emissions Control System (AMECS) according to the present invention.

FIG. 2A depicts an AMECS deploying a bonnet over a stack of an Ocean Going Vessel (OGV).

FIG. 2B shows the bonnet over the stack with an end segment of an articulating arm retracted from the bonnet.

FIG. 4 shows a detailed view of the bonnet over the stack.

FIG. 4A shows a more detailed view of a lower end of a rib of the cage.

FIG. 6 describes a method for emissions control using the AMECS according to the present invention.

FIG. 6A described the steps for processing emissions.

Corresponding reference characters indicate corresponding components throughout the several views of the drawings.

DETAILED DESCRIPTION OF THE INVENTION

Figure 3B:
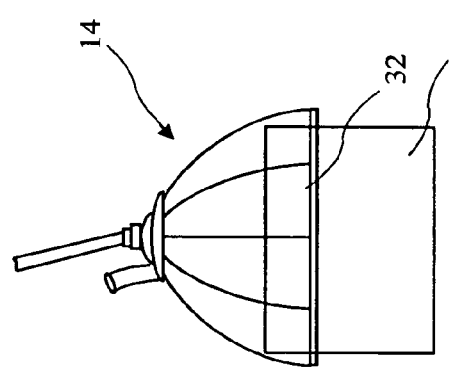
FIG. 3B shows a cage of the bonnet positioned on the stack.
Figure 3C:
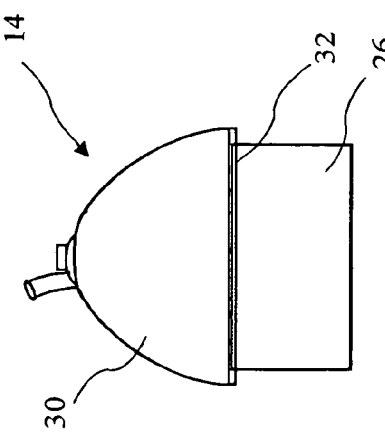
FIG. 3C shows a lower edge of the cage drawn around the stack.
Figure 3E:
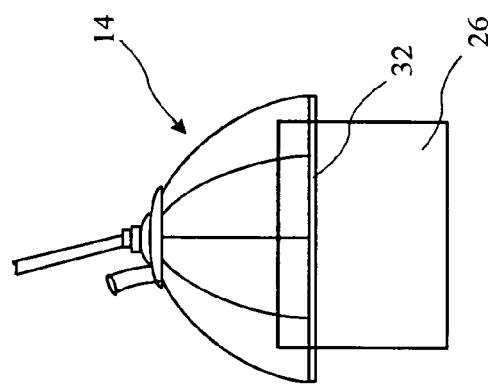
FIG. 3E shows the shroud fully lowered over the cage.
Figure 3F:
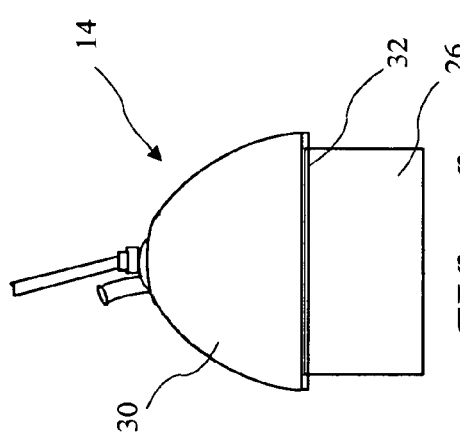
FIG. 3F shows the bonnet after the articulating arm is detached.
Figure 3A:
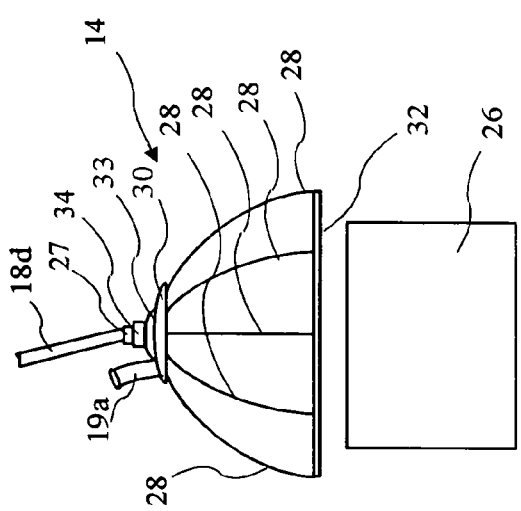
FIG. 3A shows the bonnet positioned above the stack.
Figure 3D:
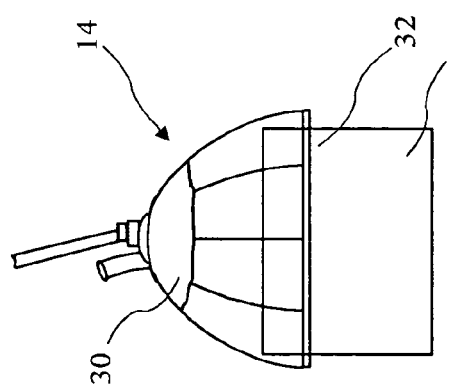
FIG. 3D shows a shroud partially lowered over the cage.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

An Advanced Maritime Emissions Control System (AMECS) 10 according to the present invention is shown generally in FIG. 1. The AMECS 10 comprises at least one Exhaust Intake Bonnet (EIB) 14, an Emissions Capture System (ECS), and an Advanced Maritime Emissions Control Unit (AMECU) 22. The AMECS 10 is preferably mounted on an Unpowered Seagoing Barge (USB) 12. The ECS comprises a tower 16, and an articulating arm. The articulating arm comprising four segments 18a, 18b, 18c, and 18d connected by joints 17.

The EIB 14 is preferably one of a multiplicity of shaped EIBs, and more preferably one of a set of four shaped EIBs, each shaped EIB is formed to cooperate with a different size and/or shape stack. The articulating arm segments 18a-18d are connected by joints 17, and the end segment 18d is detachably attachable to the EIB 14 using a payload grip 27. A first camera is attached to the articulating arm, preferably on or near the payload grip 27, to aid in guiding the payload grip 27 during attachment to the EIB 14. The EIB 14 is in fluid communication with the AMECU 22 through a duct 19. An end section of the duct 19 proximal to the EIB 14 is a flexible duct section 19a. The duct 19 is connected to the AMECU 22 which processes a flow indicated by arrows 15 to reduce undesirable emissions. When in use, the flow travels from the EIB 14 to the AMECU 22. When not in use, the EIB 14 may be detached from the articulating arm, and rest on an EIB stand 14a.

The articulating arm 18a-18d is preferably between fifty feet and one hundred and twenty feet long, and is more preferably approximately one hundred feet long. The duct 19 is preferably between twelve inches and thirty six inches in diameter, and more preferably approximately eighteen inches in diameter, and is preferably made from stainless steel. The EIBs 14 are preferably between fifteen feet and forty feet across, and are suitable for cooperation with stacks of various shape and up to twenty five feet or more across. The tower 16 is preferably between fifty feet and one hundred and twenty feet high, and is more preferably approximately one hundred feet high.

The actuating arm of the present invention is similar to known four section booms used on concrete pump trucks, for example the KVM 32 built by Schwing America Inc. in Saint Paul, Minn. The boom of the KVM 32 is capable of reaching as far as 106 feet vertically, or 93 feet laterally. Booms like the boom of the KVM 32 are described in U.S. Pat. No. 5,460,301 for "Concrete Pump Vehicle" and duct joint geometries for use with booms are described in detail in U.S. Pat. No. 6,463,958 for "Distributing Device for Thick Substance, Especially Concrete." The '301 and '958 patent are herein incorporated by reference.

The AMECS 10 is shown with the EIB 14 residing over a stack 26 of an Ocean Going Vessel 24 in FIG. 2A. The end segment 18d of the actuating arm remains attached to the EIB 14. Following attachment of the EIB 14 to the stack 26 (described in FIGS. 3A-3F), the end segment 18d is detached from the EIB 14 and pivoted to a stored position as shown in FIG. 2B leaving the flexible portion 19a of the duct, and a wire harness 70 attached to the EIB 14. The duct 19 is supported by a duct support 25 attached to the articulating arm, providing sufficient freedom of movement to allow for some relative motion between the USB 12 and the OGV 24. Preferably, approximately five feet of lateral and vertical movement is provided.

The position of the USB 12 relative to the OGV 24 is stabilized by a stabilization arm 11 connected between the tower 16 and the OGV 24. The arm 11 is preferably connected to the tower 16 a little below a midpoint of the tower 16, and the arm 11 extends approximately horizontally to the OGV 24. The arm 11 includes a shock absorber to minimize the load on the hull of the OGV 24 and to stabilize the ECS. The tower 16 and articulating arm 18a-18d preferably provide sufficient height to place the EIB 14 over the stacks of common OGVs 24, and more preferably allow sufficient height to place the EIB 14 over the stack of the largest OGVs 24.

An example of a set of steps of attachment of the EIB 14 to the stack 26 are shown in FIGS. 3A through 3F. The EIB 14 including ribs 28 forming a cage-like structure (or frame), a top portion 33 above a shroud 30, and a belt 32 near the bottom of the ribs 28, is shown above the stack 26 in FIG. 3A. The EIB 14 is shown lowered over the stack 26 in FIG. 3B. The downward end of the EIB 14 is drawn to close around the stack 26 in FIG. 3C. The shroud 30 is partially lowered over the ribs 28 in FIG. 3D. The shroud 30 is fully lowered over the ribs 28 in FIG. 3E. The articulating arm is detached in FIG. 3F, and the attachment of the EIB 14 to the stack 26 in compete. The steps described above are not exclusive and, for example, the articulating arm may be detached before lowering the shroud 30 over the ribs 28. The EIB 14 preferably includes eight to twenty four ribs 28, and more preferably sixteen ribs 28.

A detailed view of the EIB 14 is shown in FIG. 4. A top portion 33 resides above the shroud 30, and preferably comprises a capture ring assembly 34 at the top of the EIB 14, which capture ring assembly 34 is used to attach to the EIB 14 to the payload grip 27 (see FIG. 1). The capture ring assembly 34 is designed to be easily attached and detached from the payload grip 27 (see FIG. 1). An upper opening of the capture ring assembly 34 has a large aperture, with a self-aligning locking mechanism for engaging the payload grip 27. Preferably, the payload grip 27 includes a spring latching mechanism which will release locking members into the capture ring assembly 34 when the payload grip 27 is in the proper position.

At least one motor 36 is connected to a hub 40, the motor 36 and hub 40 preferably residing inside the top portion 33 and are indicted by dashed lines in FIG. 4. The motor 36 is preferably a constant-torque motor that when activated, tightens a cord 42 thereby compressing the ribs 28 and providing consent pressure for a friction-seal. Cord ends 42a and 42b of the cord 42 wind around the hub 40. The cord 42 runs down to belt pulleys 45, and then around the outside of the ribs 28 through guides 43 to draw the EIB 14 around the stack 26. The EIB 14 may thus be closed (or compressed) around the stack 26 by winding ends the cord ends 42a, 42b onto the hub 40. The motor 36 controls the tension on the cord 42, to provide an air seal between the EIB 14 and the stack 26, to firmly hold the EIB 14 on the stack 26, and to prevent damage to the EIB 14 or the stack 26 during operation of the AMECS 10.

Shroud cords 44 loop vertically around the outside of the EIB 14 between an upward end and a downward end of the frame, and are attached to the shroud 30 near a lower edge 52 of the shroud 30, to raise and lower the shroud 30 over the ribs 28. A shroud notch 41 in the guide 43 provides a seat for the shroud 30 when fully lowered. A second camera and a laser guided positioning system are preferably attached to the EIB 14 to aid in guiding the EIB 14 over the stack 26. For example, a camera may be mounted in the top portion 33 and pointed down. Video from the camera is used to assist the operator in positioning the EIB 14 over the ships stack 26. Once the EIB 14 is over the stack 26, the laser positioning system guides the EIB 14 into its final position around the stack 26. Alternatively, a system for controlling a boom such as described in U.S. Pat. No. 5,823,218 for "Large Manipulator, Especially for Self-Propelled Concrete Pumps, and Method for Operating it," may be used to automatically position the EIB 14. The system described in the '218 patent may also be utilized to maintain the position of the articulating arm relative to the stack 26 during operation of the AMECS 10, and for re-attaching the articulating arm to the EIB 14 when the EIB 14 is to be removed from the stack 26. The '218 patent is herein incorporated by reference.

The EIB 14 further preferably includes a pressure sensor, and more preferably includes two pressure sensors (a primary sensor and a backup sensor) to provide feedback to a System Operational Control Unit (SOCU), which in turn regulates the speed of a tower blower assembly maintaining a constant negative pressure within the duct 19, wherein the blower is preferably a centrifugal blower. Maintaining constant pressure assures that nearly all of the exhaust gases are captured and funneled into the AMECU 22 for processing, without adversely affecting engine performance and while compensating for main and auxiliary engine turn-on and startup, and for back pressure in the AMECU 22.

A more detailed view of a lower portion of a rib 28 is shown in FIG. 4A. The rib 28 is preferably a springy (i.e., returns to an original shape when released) curved tube, is preferably made from stainless steel or fiberglass, and has a lower end 54. The rib 28 is required to retain sufficient memory to "spring" back to the open position when the cord 42 is released. A shroud pulley 46 resides on an axle 48 held by a bracket 50 near the lower end 54. The shroud cord 44 runs around the shroud pulley 46 and through the rib 28. The shroud cord 44 is preferably drawn by a motor residing above the ribs 28. In another embodiment, a motor with a hub resides near the lower end 54 of each rib 28, and the shroud cord 44 is wound around the hub. The belt 32 is shown in cross-sectional view, and the cord 42 is shown running through a guide 43. While the bracket 50 and guide 43 are shown as two distinct parts in FIG. 4A, they may be a single bracket/guide.

The shroud 30 is preferably made from a heat and emission resistant material for long life, for example, kevlar® fiber or kapton® polyimide film, and the shroud 30 preferably resists damage from chemicals found in OGV 24 exhaust, and temperatures up to 350 degrees Celsius. The belt 32 is preferably between six inches and fourteen inches thick and ten inches to fourteen inches high, and more preferably approximately ten inches thick and approximately twelve inches high. The belt 32 is preferably made from a soft or sponge-like (i.e., foam) material which provides a degree of air seal between the EIB 14 and the stack 26, and also retains the EIB 14 onto the stack 26 through surface friction and will not damage the stack. For example, the belt may be made from neoprene or the like material. Alternatively, the belt may be an inflatable belt. The cords 42, 44 are preferably made from non UV sensitive material, and more preferably from nylon.

Figure 5A:
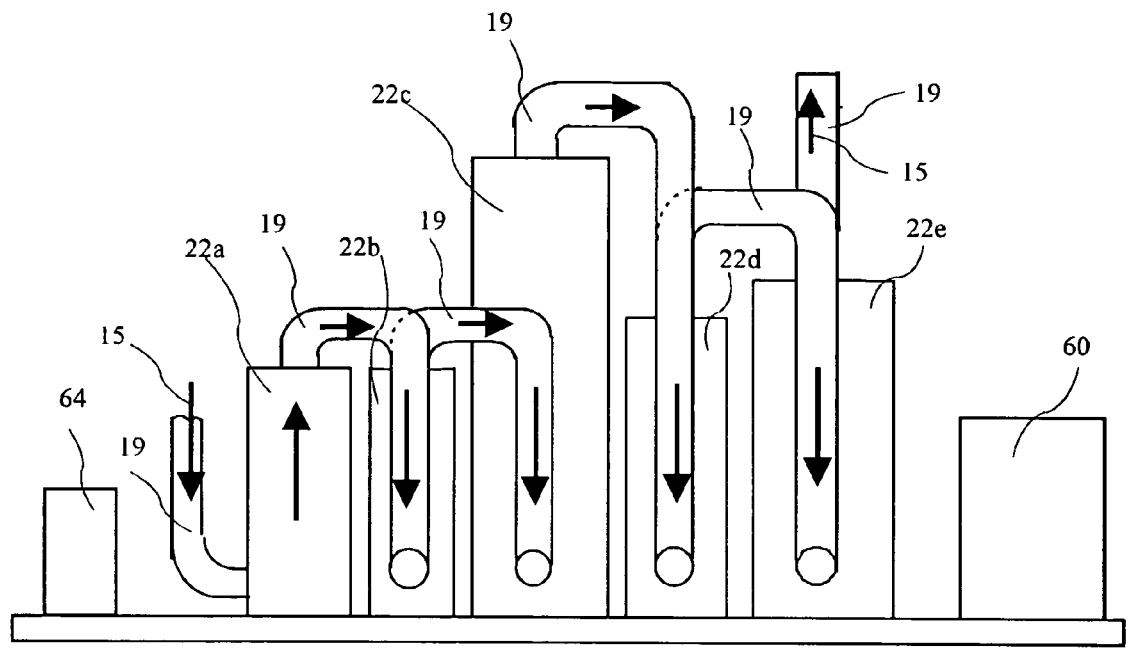
FIG. 5A is a side view of an Advanced Maritime Emissions Control Unit (AMECU) and associated equipment.
Figure 5B:
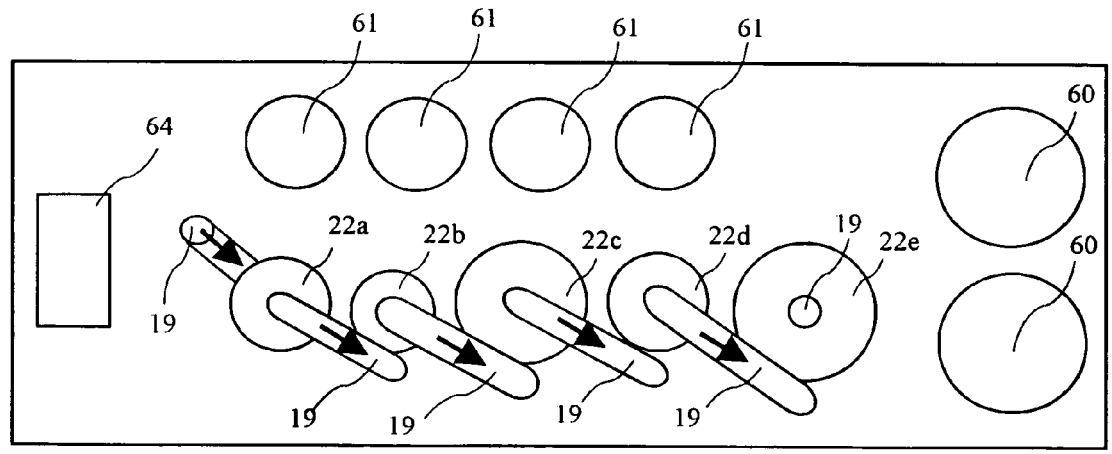
FIG. 5B is a top view of the AMECU and associated equipment.

A detailed view of an exemplar AMECU 22 layout and associated equipment is shown in FIG. 5A in side view, and in FIG. 5B in top view. The exemplar AMECU 22 comprises two primary treatment systems. The first system, accomplishes reduction of nitrogen oxides (NOx) as its primary purpose, and the second system focuses on the reduction of particulate matter (PM). Each system has as a secondary benefit, the reduction of other atmospheric contaminants.

The first system comprises four stages. The first stage comprises a Pre Conditioning Chamber (PCC) quench vessel 22a. The second stage comprises oxidation column 22b. The third stage comprises reduction column 22c. The fourth stage comprises a caustic (or polishing) column 22d. The second system comprises a single stage which is a wet electrostatic precipitation system 22e which further reduces the concentration of PM.

While a five stage AMECU 22 is described herein, AMECS 10 may include an emissions control unit with a different number of stages, different order of stages, different allocation, and/or, different processing to reduce other emissions, and any AMECS including any of these variations of emissions control units for processing OGV exhaust is intended to come within the scope of the present invention. Arrows 15 indicate the direction of exhaust flow through the AMECU 22.

Continuing with FIGS. 5A, 5B, The AMECU 22 resides proximal to waste tanks 60, storage tanks 61, a power source 64 and the cabin 13 which serves as a control room.

A method for using the AMECS 10 for emissions control is described in FIG. 6. The method includes positioning the EIB 14 over a stack 26 of an OGV 24 at step 100. Tightening a cage around the stack at step 102. Lowering a shroud over the cage at step 104. Retracting the end segment 22d at step 106. Drawing the exhaust through the duct 19 to the AMECU 22 at step 108. Processing the exhaust at step 110. Releasing the processed exhaust at step 112.

Processing the exhaust at step 110 preferably comprises the steps of pre conditioning the exhaust at step 114, oxidizing at step 116, reducing at step 118, polishing at step 120, and precipitating at step 122.

The invention further contemplates a land based structure in place of the USB 12 for use when the OGV 24 is moored to a dock, or for control of emissions from land based equipment. The land based structure would support the same elements as the USB 12 based AMECS 10 with the exception that the tower 16, AMECU 22, and associated equipment would be supports on the land instead of on the USB 12. The system may, for example, be mounted to a truck, a trailer, or a rail road car.

While the invention herein disclosed has been described by means of specific embodiments and applications thereof, numerous modifications and variations could be made thereto by those skilled in the art without departing from the scope of the invention set forth in the claims.

We claim:

1. An advanced maritime emissions control system comprising:
   a bonnet configured for residing over a ship stack for capturing exhaust from the ship stack, the bonnet contractable around the ship stack to sufficiently grasp the ship stack to hold the bonnet in place over the ship stack;
   an emissions control unit for processing the exhaust from the stack; and
   a duct for carrying the exhaust from the bonnet to the emissions control unit.

2. The emissions control system of claim 1, further including:
   a tower; and
   an articulating arm extending from the tower,
   wherein the bonnet is positioned on the stack by the articulating arm.

3. The emissions control system of claim 1, further including:
   a tower; and
   an articulating arm extending from the tower,
   wherein the duct is supported by the articulating arm.

4. The emissions control system of claim 3, wherein the articulating arm includes segments.

5. The emissions control system of claim 4, wherein the articulating arm includes pivoting joints between the segments.

6. The emissions control system of claim 4, wherein the segments include an end segment connectable to the bonnet for placing the bonnet on the stack, and wherein the end segment is disconnectable from the bonnet.

7. The emissions control system of claim 1, wherein the bonnet is selectable from a multiplicity of shaped bonnets.

8. The emissions control system of claim 1, wherein the bonnet comprises a top, a cage extending from the top, and a shroud lowerable over the cage.

9. The emissions control system of claim 8, wherein the cage comprises downwardly reaching curved ribs.

10. The emissions control system of claim 9, wherein the ribs comprise between eight and twenty four ribs.

11. The emissions control system of claim 10, wherein the tubes comprise about sixteen ribs.

12. The emissions control system of claim 9, wherein shroud cords attach to a lower edge of the shroud and wherein pulling on the shroud cords lowers the shroud over the tubes.

13. The emissions control system of claim 9, wherein the ribs comprise tubes, and wherein the tubes include pulleys near a lower end of each tube, and wherein the shroud cords loop around the pulleys, wherein the shroud cords are pulled upward through the tubes to lower the shroud.

14. The emissions control system of claim 1, wherein the emissions control unit includes a Pre Conditioning Chamber (PCC) quench vessel.

15. The emissions control system of claim 1, wherein the emissions control unit includes an oxidation column.

16. The emissions control system of claim 1, wherein the emissions control unit includes a reduction column.

17. The emissions control system of claim 1, wherein the emissions control unit includes a caustic column.

18. The emissions control system of claim 1, wherein the emissions control unit includes a wet electrostatic precipitation system.

19. A method for emissions control, the method comprising:
   securing a bonnet over a stack of an Ocean Going Vessel (OGV) to capture exhaust;
   drawing the exhaust captured by the bonnet through a duct to an emissions control unit; and
   processing the exhaust by the emissions control unit.

20. The method of claim 19, wherein the bonnet includes a cage and a shroud, and wherein securing the bonnet over the stack comprises:
   positioning the cage over a stack;
   tightening the cage around the stack; and
   lowering the shroud over the cage.

21. The method of claim 19, wherein processing the exhaust by the emissions control system comprises:
   processing the exhaust using a Pre Conditioning Chamber (PCC) quench vessel;
   processing the exhaust using an oxidation column;
   processing the exhaust using a reduction column;
   processing the exhaust using a caustic (or polishing) column; and
   processing the exhaust using a wet electrostatic precipitation system.

22. A bonnet for capturing exhaust from a stack, the bonnet comprising:
   a frame having an upward end, outward side, an inward side, and a downward end;
   a shroud on the outward side for enclosing the frame;
   a belt attached to the inward side near the downward end; and
   means for tightening the downward end around the stack,
   wherein the bonnet is one of several bonnets of different sizes and shapes suitable to cooperating with Ocean Going Vessel (OGV) stacks of different sizes and shapes.

23. The bonnet of claim 22, wherein the several bonnets comprise four bonnets of different sizes and shapes.

24. A bonnet for capturing exhaust from a stack, the bonnet comprising:
   a frame having an upward end, outward side, an inward side, and a downward end which is tightenable around the stack;
   a shroud on the outward side for enclosing the frame; and
   a belt attached to the inward side near the downward end;
   wherein the frame comprises springy downwardly extending ribs.

25. A bonnet for capturing exhaust from a stack, the bonnet comprising:
- a frame having an upward end, outward side, an inward side, and a downward end which is tightenable around the stack;
- a shroud on the outward side for enclosing the frame; and
- a belt attached to the inward side near the downward end,
- wherein the belt is made from a foam material to provide an air seal between the shroud and the stack, and to retain the bonnet in place on the stack, when the downward end of the frame is tightened around the stack.

26. A bonnet for capturing exhaust from a stack, the bonnet comprising:
- a frame having an upward end, outward side, an inward side, and a downward end which is tightenable around the stack;
- a shroud on the outward side for enclosing the frame; and
- a belt attached to the inward side near the downward end,
- wherein the belt is between six inches and fourteen inches thick and between ten inches to fourteen inches high.

27. The bonnet of claim 26, wherein the belt is approximately ten inches thick and approximately twelve inches high.

28. A bonnet for capturing exhaust from a stack, the bonnet comprising:
- a frame having an upward end, outward side, an inward side, and a downward end which is tightenable around the stack;
- a shroud on the outward side for enclosing the frame; and
- a belt attached to the inward side near the downward end,
- a capture ring assembly at the frame upward end, the capture ring including an upward facing opening with a self-aligning locking mechanism for cooperation with an articulating arm.

29. A bonnet for capturing exhaust from a stack, the bonnet comprising:
- a frame having an upward end, outward side, an inward side, and a downward end which is tightenable around the stack;
- a shroud on the outward side for enclosing the frame;
- a belt attached to the inward side near the downward end; and
- a camera and laser guided positioning system, wherein video from the camera is provided to an operator to use in positioning the bonnet over the stack, and wherein when the bonnet is in position over the stack, the laser guided positioning system automatically guides the bonnet into position around the stack.

30. The bonnet of claim 24, wherein the means for tightening the downward end around the stack comprises a cord running around the outside of the frame near the downward end of the frame, and wherein drawing the cord tightens the downward end of the frame around the stack.

31. The bonnet of claim 30, further including a constant-torque motor which when activated, tightens the cord thereby tightening the belt and providing consent pressure between the belt and the stack.

32. A bonnet for capturing exhaust from a stack, the bonnet comprising:
- a frame having an upward end, outward side, an inward side, and a downward end which is tightenable around the stack;
- a shroud on the outward side for enclosing the frame; and
- a belt attached to the inward side near the downward end,
- wherein the shroud is lowerable over the frame, and raisable to a position at the upward end of the frame.

33. The bonnet of claim 32, wherein the shroud is lowerable and raisable using shroud cords attached to a lower edge of the shroud, wherein the shroud cords loop down outside the frame from the upward end of the frame, around pulleys near the downward end of the frame, and back to the upward end of the frame.

34. A bonnet for capturing exhaust from a stack, the bonnet comprising:
- a frame having an upward end, outward side, an inward side, and a downward end which is tightenable around the stack;
- a shroud on the outward side for enclosing the frame; and
- a belt attached to the inward side near the downward end,
- wherein the bonnet includes at least one pressure sensor which provides a pressure measurement to regulate the speed of a blower assembly to maintain a constant negative pressure within the intake duct.

35. A bonnet for capturing exhaust from a stack, the bonnet comprising:
- a frame having an upward end, outward side, an inward side, and a downward end which is tightenable around the stack;
- a shroud on the outward side for enclosing the frame; and
- a belt attached to the inward side near the downward end,
- wherein the bonnet includes an interface for a flexible duct, and wherein the flexible duct allows relative motion between the bonnet and an emissions control unit, wherein the exhaust from the stack is drawn through the flexible duct.

* * * * *